(12) United States Patent
Bieg et al.

(10) Patent No.: US 7,429,231 B2
(45) Date of Patent: Sep. 30, 2008

(54) ROTARY DRIVE FOR A BELT TENSIONER

(75) Inventors: Wilfried Bieg, Eschach (DE); Thomas Moedinger, Aldorf (DE); Gerhard Malbrich, Gschwend (DE)

(73) Assignee: TRW Automotive GmbH, Alfdorf (DE)

( * ) Notice: Subject to any disclaimer, the term of this patent is extended or adjusted under 35 U.S.C. 154(b) by 321 days.

(21) Appl. No.: 11/411,704

(22) Filed: Apr. 26, 2006

(65) Prior Publication Data

US 2006/0243074 A1   Nov. 2, 2006

(30) Foreign Application Priority Data

Apr. 27, 2005 (DE) ........................ 10 2005 019 603

(51) Int. Cl.
*F16H 57/08* (2006.01)
(52) U.S. Cl. .......................... 475/331; 475/14; 475/17; 297/474; 297/475; 242/374
(58) Field of Classification Search ................. 475/14, 475/17, 331; 297/464, 468, 469, 474, 475, 297/482, 483; 280/806, 807; 242/371, 374, 242/390.8, 390.9; 60/632; 123/24 A
See application file for complete search history.

(56) References Cited

U.S. PATENT DOCUMENTS

| | | | |
|---|---|---|---|
| 5,485,970 A | * | 1/1996 | Steffens, Jr. ................. 242/374 |
| 5,505,399 A | | 4/1996 | Schmid et al. |
| 5,681,004 A | * | 10/1997 | Specht ........................ 242/374 |
| 5,906,326 A | * | 5/1999 | Specht ........................ 242/374 |
| 6,427,935 B1 | * | 8/2002 | Fujii et al. ................ 242/390.9 |

FOREIGN PATENT DOCUMENTS

| | | |
|---|---|---|
| DE | 2535380 | 2/1977 |
| DE | 9405834.2 | 10/1994 |
| DE | 4319273 | 12/1994 |
| EP | 0628454 | 12/1994 |
| GB | 2307844 | 6/1997 |

\* cited by examiner

*Primary Examiner*—David D. Le
(74) *Attorney, Agent, or Firm*—Tarolli, Sundheim, Covell & Tummino LLP

(57) ABSTRACT

A rotary drive for a belt tensioner includes a housing, a pinion rotatably mounted therein, and at least one driving gear coupled to the pinion, the driving gear being mounted in the housing and being adapted to be driven by pressurized gas introduced into a pressure chamber. Formed in the driving gear is a cavity having a substantially radially extending wall which, in the installed state, is opposite to a protrusion which projects into the cavity and is rigidly connected to the housing, the wall of the cavity and the protrusion forming part of a wall of the pressure chamber.

14 Claims, 3 Drawing Sheets

ROTARY DRIVE FOR A BELT TENSIONER

TECHNICAL FIELD

The invention relates to a rotary drive for a belt tensioner.

BACKGROUND OF THE INVENTION

A rotary drive of the type concerned is known from EP 0 628 454 A1. In this rotary drive a driving gear configured as a ring gear is coupled via three planetary gears to a sun gear forming a pinion, the planetary gears engaging in the internal toothing of the ring gear and in the external toothing of the sun gear. Formed at the outer periphery of the ring gear is a rotary piston extension which forms, together with the ring gear, a single-vane rotary piston. This single-vane rotary piston moves in an annular space which surrounds the ring gear and may be acted upon with pressurized gas.

The invention, in contrast, provides a rotary drive for a belt tensioner which is distinguished by a particularly compact construction.

BRIEF SUMMARY OF THE INVENTION

This is achieved in a rotary drive for a belt tensioner, including a housing, a pinion rotatably mounted therein, and at least one driving gear coupled to the pinion, the driving gear being mounted in the housing and being adapted to be driven by pressurized gas introduced into a pressure chamber. Formed in the driving gear is a cavity having a substantially radially extending wall which, in the installed state, is opposite to a protrusion which projects into the cavity and is rigidly connected to the housing, the wall of the cavity and the protrusion forming part of a wall of the pressure chamber. The remaining pressure chamber wall is likewise formed by walls of the cavity or the housing. If the pressure chamber is now acted upon with pressurized gas, it will attempt to expand. Since the protrusion is housing-fixed and the wall lying opposite thereto at a small distance is movable relative to the housing (the driving gear is rotatably mounted in the housing), the cavity wall moves relative to the protrusion: The driving gear rotates. Thus, the pressure chamber is configured in the interior of the driving gear itself, whereby a pressure chamber which is disposed outside the gear and which would increase the space required may be dispensed with. Thus, a compact construction having a diameter of approx. 65 mm only and a width of 30 mm may be implemented.

Preferably, the wall of the cavity in the non-operated state includes an angle between 10° and 45° with the protrusion. Thus, the intermediate pressure chamber comprises in the installed state a comparatively low volume, which results in the rotary drive taking effect in the case of activation almost without any delay in time.

The protrusion preferably comprises a gasket which closes off the pressure chamber gas-tightly to a large extent.

For an easy assembly the housing may comprise a cap, at least one extension forming the protrusion being integrally molded thereon.

According to a first embodiment of the invention the driving gear is configured as a ring gear whose periphery comprises in a partial region an internal toothing. If in this arrangement the ring gear has the outer diameter of a belt retractor with which the rotary drive is coupled, a maximum possible tensioning efficiency is achieved, the available space being made use of at an optimum.

The partial region may extend across more than half of the periphery, whereby a particularly high tensioning efficiency is achieved.

Preferably, the cavity substantially has the shape of a circular ring sector whose central angle amounts to less than 180°. By means of the central angle the size of the pressure chamber in the expanded state (after activation of the rotary drive) is determined. At the same time the angle through which the internal toothing extends and the central angle complement each other to approx. 360°.

Advantageously, in the housing there is mounted an intermediate gear which meshes both with the ring gear and the pinion. In this manner a planetary gear transmission is obtained, in which the pressure chamber is disposed in the interior of the ring gear. Thus, the tensioning efficiency may variably be adjusted within certain limits by means of different transmission ratios.

According to a second embodiment of the invention the driving gear comprises a surrounding external toothing and is in direct engagement with the pinion. Thereby, a rotary drive materializes, which is distinguished by a particularly compact construction and a low (inert) mass.

Preferably, the cavity substantially has the shape of a circular ring that is interrupted at one point by the radially extending wall. Thus, a particularly high tensioning efficiency may be achieved.

Advantageously, several driving gears are provided which are all able to mesh with the pinion. The driving gears are always in engagement with the pinion, whereby the load is uniformly distributed on a plurality of teeth on the pinion. However, this arrangement does not constitute a planetary gear transmission, but the driving gears are directly and separately driven with pressurized gas.

It is possible to provide a common pyrotechnical propellant charge which is connected via branching flow ducts to the pressure chambers of the driving gears. Thereby, it is always ensured that all driving gears are simultaneously acted upon with pressurized gas.

Preferably, four driving gears are provided which are uniformly distributed about the pinion. In this manner the pinion is not subjected to any one-sided forces acting laterally thereon.

DETAILED DESCRIPTION OF THE PREFERRED EMBODIMENTS

Figure 1:
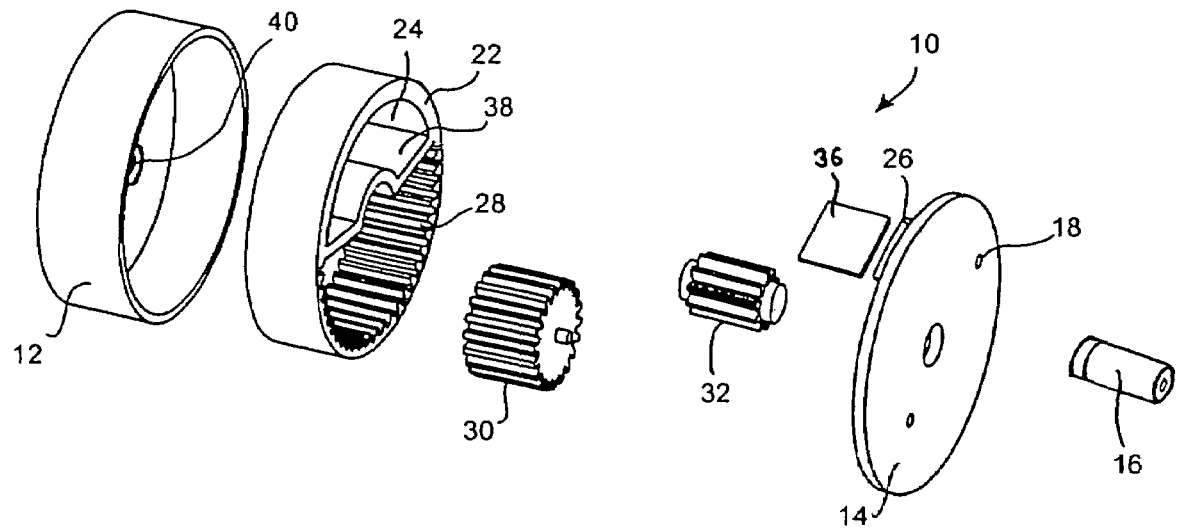
FIG. 1 shows an exploded view of a rotary drive according to a first embodiment of the invention.
Figure 2:
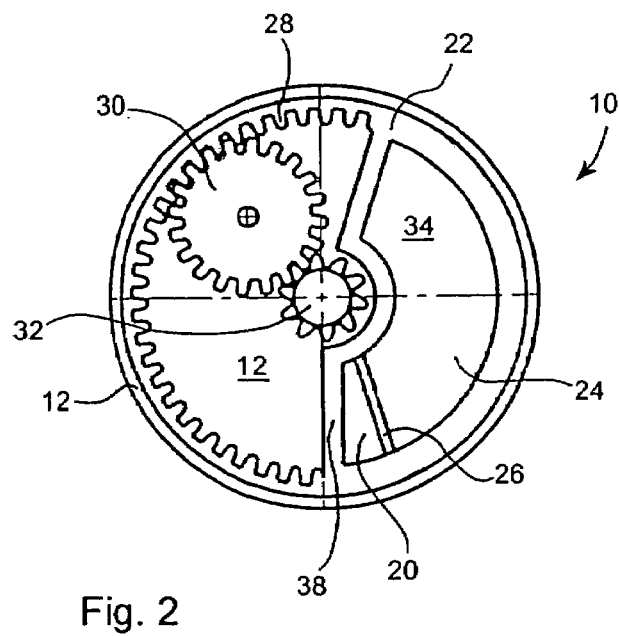
FIG. 2 shows a sectional view of the rotary drive of FIG. 1.

FIGS. 1 and 2 show a rotary drive 10 for a belt tensioner according to a first embodiment of the invention. The rotary drive 10 comprises a housing which is formed of a pot-like housing part 12 and a cap 14. Disposed on the cap 14 is a pyrotechnical propellant charge 16 which includes an ignition means for activating the propellant charge (not shown).

Via a hole 18 in the cap 14 the propellant charge 16 is in fluid communication with a pressure chamber 20. The walls of the pressure chamber 20 are formed by the wall of a cavity 24 configured in a ring gear 22, the cap 14 itself, and a protrusion in the shape of an extension 26 integrally molded on the cap 14. The ring gear 22 is mounted in the housing part 12 and in the cap 14 and includes, apart from the cavity 24 which substantially has the shape of a circular ring sector having a central angle <180°, an internal toothing 28. The latter extends across a partial region of the ring gear 22, the partial region amounting to somewhat more than half of the periphery, and meshes with an intermediate gear 30 which is likewise mounted in the housing and which in turn is in direct engagement with a pinion 32 that is centrically disposed in the housing.

It has to be emphasized that the ring gear 22 comprises a bottom 34 only in the region of the cavity 24 and is designed to be open in the region of the internal toothing 28. The extension 26 comprises a rubber gasket 36 which seals itself when the pressure chamber 20 is acted upon with pressure. A radially extending wall of the cavity 24 lying opposite to the extension 26 in the installed state is provided with the reference numeral 38 in the Figures. An opening 40 centrally disposed in the bottom of the housing part 12 serves for bearing the pinion 32 and permits to couple the rotary drive 10 to a shaft of a conventional belt retractor (not shown). A further function of the housing is the protection of the interior kinematics of the rotary drive 10 against dirt.

In the normal driving operation the rotary drive 10 is initially uncoupled from the shaft of the belt retractor. In a restraint case the pyrotechnical propellant charge 16 is ignited and develops a gas pressure that is directed through the hole 18 in the cap 14 into the pressure chamber 20 of the ring gear 22, the pressure chamber 20 being sealed by the rubber gasket 36. The gas pressure quasi "supports" on the housing-fixed and sealed wall formed by the extension 26 and "presses" on the rotationally movable cavity wall 38. Thereby, the ring gear 22 starts to rotate clockwise, whereby the intermediate wheel 30 is driven anti-clockwise. The intermediate wheel 30 in turn drives the pinion 32 clockwise. In this moment the rotary drive 10, more precisely the pinion 32, couples in a manner known per se to the shaft of the belt retractor.

On account of the torque transmission from the pinion 32 to the belt retractor shaft obtained in this manner an existing belt slack is retracted, in order to reduce a forward movement of a vehicle occupant during an accident. The rotary drive 10 in accordance with the invention retracts approx. 160 mm of a belt webbing in a period of 8 ms, it being easily possible to implement a variable tensioning efficiency by means of different transmission ratios between the gears involved. In the embodiment shown the transmission between the ring gear 22 and the intermediate gear 30 amounts to approx. 1:3, between the intermediate gear 30 and the pinion 32 it amounts to approx. 1:1.8. Thus, in a 120°-rotation of the ring gear 22 the pinion 32 rotates 1.8 times.

A further advantage of the rotary drive 10 in accordance with the invention is that it may be preassembled as a complete module.

Figure 3:
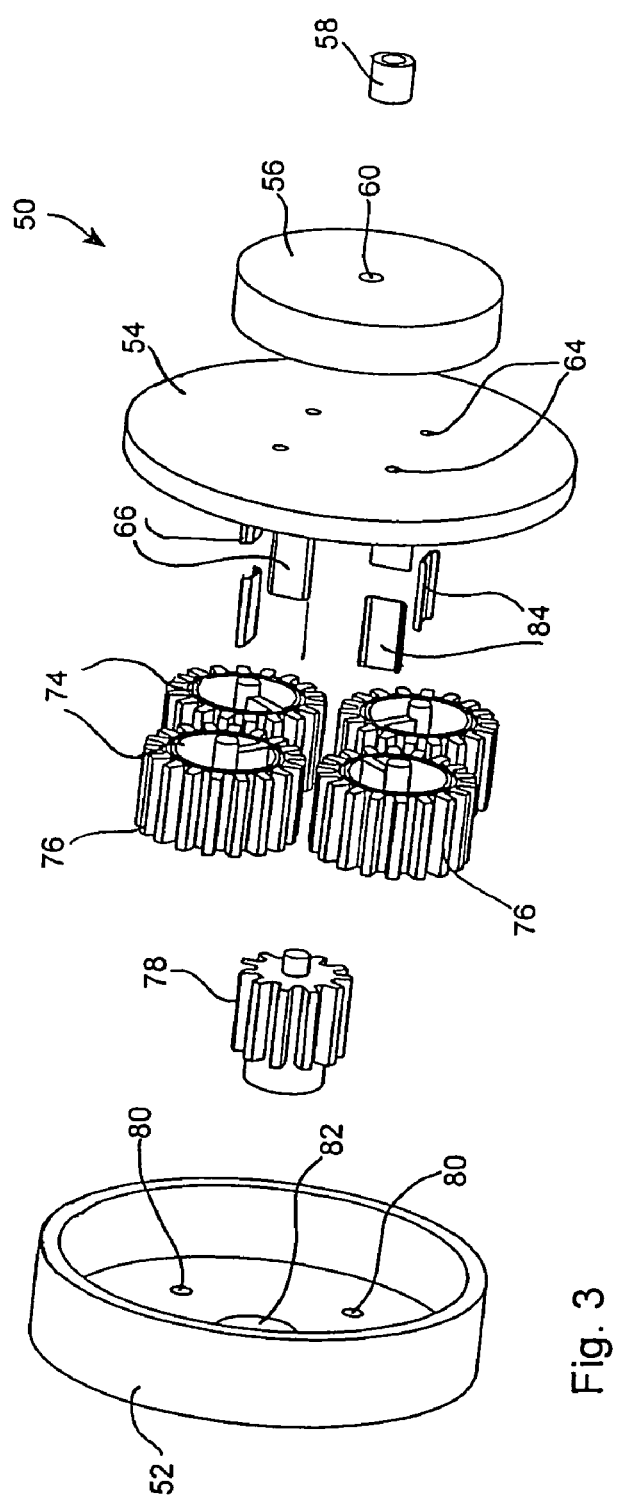
FIG. 3 shows an exploded view of a rotary drive according to a second embodiment of the invention.
Figure 5:
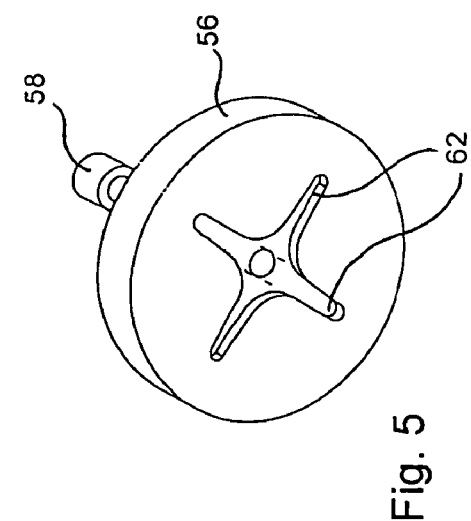
FIG. 5 shows a perspective view of a pressure distributing plate which is employed with the rotary drive according to FIG. 3.
Figure 6:
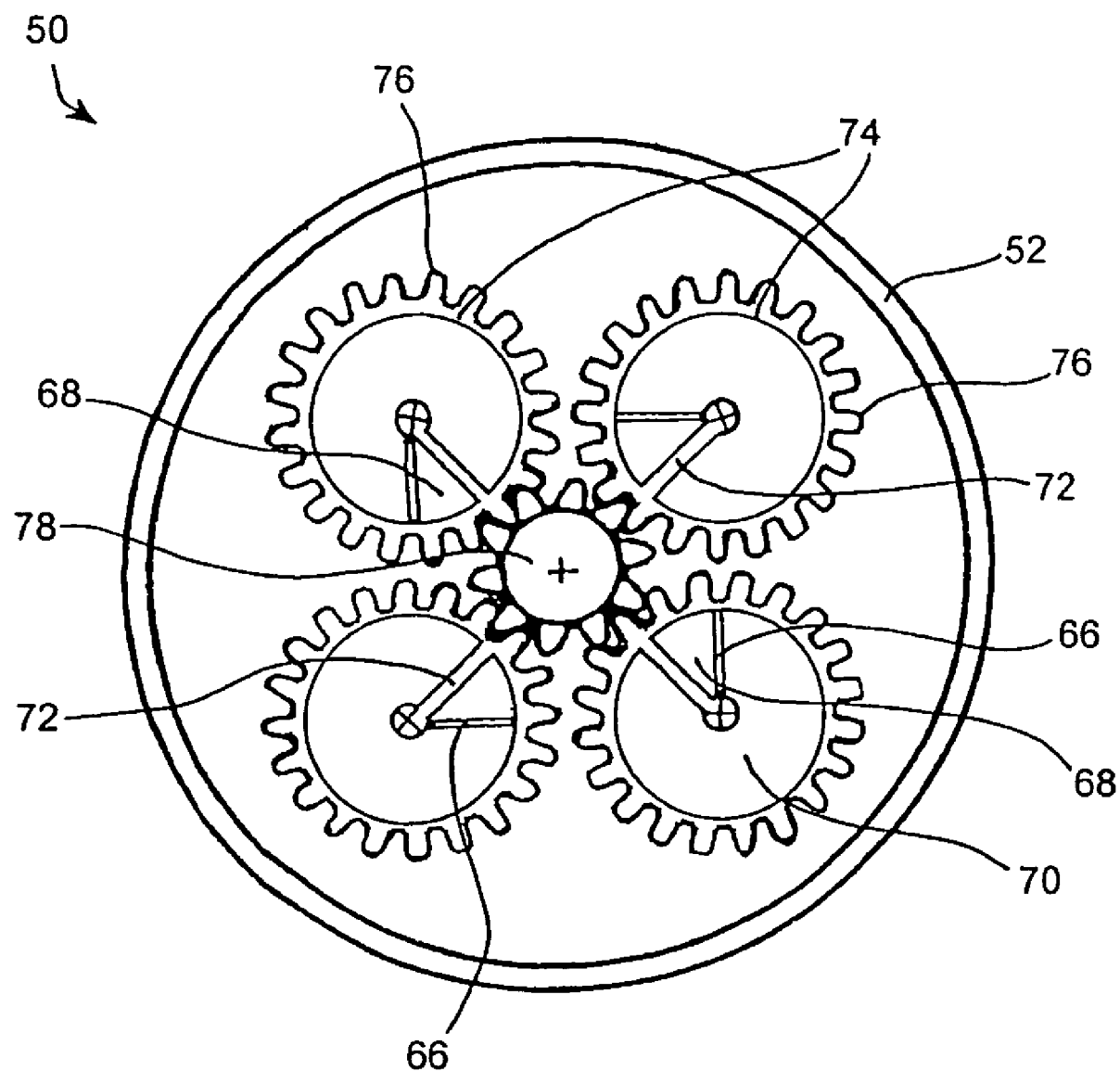
FIG. 6 shows a sectional view of the rotary drive of FIG. 3.

FIGS. 3 and 6 show a rotary drive 50 for a belt tensioner according to a second embodiment of the invention, which operates according to the same basic principle as the rotary drive 10. The rotary drive 50, too, comprises a housing formed of a pot-like housing part 52 and a cap 54, a pressure distributing plate 56 being, however, additionally disposed thereon. The pressure distributing plate 56 comprises a hole 60 communicating with a pyrotechnical propellant charge 58, the hole 60 in turn being in fluid communication with four holes 64 in the cap 54 via four branching flow ducts 62.

Figure 4:
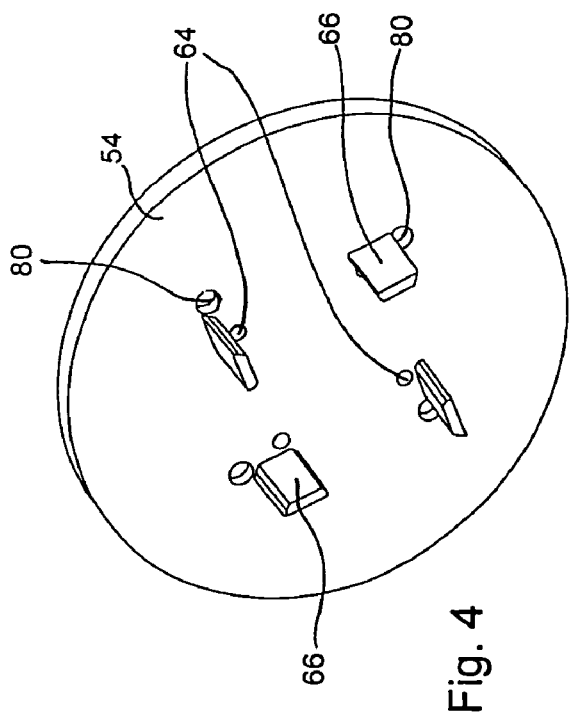
FIG. 4 shows a perspective view of a cap of the rotary drive of FIG. 3.

The cap 54 (see in particular FIG. 4) further comprises four extensions 66, each of which forms a rigid wall of one of a total of four pressure chambers 68. The remaining walls of the pressure chambers 68 are formed by the cap 54 and the walls of one cavity 70 each, which has the shape of a circular ring interrupted by a radially extending wall 72 and which is configured in the interior of one of four driving gears 74.

All of the four driving gears 74 comprise a surrounding external toothing 76 that meshes with a pinion 78 which, just as the driving gears 74, is rotatably mounted in the housing. Depressions 80 provided in the housing part 52 and in the cap 54 serve for bearing the driving gears 74 in the housing. The housing part 52 further comprises an opening 82 in which the pinion 78 is mounted and via which it may be coupled to the shaft of a belt retractor. For sealing the pressure chambers 68 the extensions 66 also include rubber gaskets 84.

As has already been described with reference to the rotary drive 10, the rotary drive 50 is also uncoupled during the normal retraction of the belt and comes into contact with the belt retractor shaft only in a restraint case. In the latter case the pyrotechnical propellant charge 58 is ignited and develops a gas pressure which is distributed through the flow ducts 62 in the pressure distributing plate 56 on the four sealed pressure chambers 68. Thereby, the driving gears 74 which are not reciprocally in engagement, but each of which is driven separately for itself, start to rotate anti-clockwise. On account of the rotation of the driving gears 74 the pinion 78 is driven clockwise. In this moment the rotary drive 50 couples to the shaft of the belt retractor and starts to likewise rotate the latter. Thereby, the belt webbing is retracted and the forward movement of the vehicle occupant is reduced.

The rotary drive 50 as well is distinguished by a particularly compact construction. On account of different combinations of the driving gears 74 and the pinion 78 regarding the number of teeth and the reference diameter thereof different tensioning efficiencies may be achieved in this arrangement as well. For example, the embodiment shown has a transmission ratio of approx. 2 between the driving gears 74 and the pinion 78, i.e. almost two rotations of the pinion 78 are possible.

The invention claimed is:

1. A rotary drive for a belt tensioner, including
   a housing,
   a pinion (32; 78) rotatably mounted therein, and
   at least one driving gear coupled to the pinion (32; 78), the driving gear being mounted in the housing and being adapted to be driven by pressurized gas introduced into a pressure chamber (20; 68),
   in the driving gear there being formed a cavity (24; 70) having a substantially radially extending wall (38; 72) which, in the installed state, is opposite to a protrusion which projects into the cavity (24; 70) and is rigidly connected to the housing, the wall (38; 72) of the cavity (24; 70) and the protrusion forming part of a wall of the pressure chamber (20; 68).

2. The rotary drive according to claim 1, wherein the wall (38; 72) of the cavity (24; 70) in the non-operated state includes an angle between 10° and 45° with the protrusion.

3. The rotary drive according to claim 1, wherein the protrusion comprises a gasket (36; 84).

4. The rotary drive according to claim 1, wherein the housing comprises a cap (14; 54), at least one extension (26; 66) forming the protrusion being integrally molded thereon.

5. The rotary drive according to claim 1, wherein the driving gear is configured as a ring gear (22), whose periphery comprises in a partial region an internal toothing (28).

6. The rotary drive according to claim 5, wherein the partial region extends across more than half of the periphery.

7. The rotary drive according to claim 5, wherein the cavity (24) substantially has the shape of a circular ring sector whose central angle amounts to less than 180°.

8. The rotary drive according to claim 5, wherein in the housing there is mounted an intermediate gear (30) which meshes both with the ring gear (22) and the pinion (32).

9. The rotary drive according to claim 1, wherein the driving gear (74) comprises a surrounding external toothing (76) and is in direct engagement with the pinion (78).

10. The rotary drive according to claim 9, wherein the cavity (70) substantially has the shape of a circular ring that is interrupted at one point by the radially extending wall (72).

11. The rotary drive according to claim 9, wherein a plurality of driving gears (74) are provided.

12. The rotary drive according to claim 11, wherein all of the driving gears (74) mesh with the pinion (78).

13. The rotary drive according to claim 11, wherein there is provided a common pyrotechnical propellant charge (58) which is connected via branching flow ducts (62) to the pressure chambers (68) of the driving gears (74).

14. The rotary drive according to claim 11, wherein there are provided four driving gears (74) which are uniformly distributed about the pinion (78).

* * * * *